No. 859,609. PATENTED JULY 9, 1907.
L. H. MARTELL.
PACKING FOR PISTON RODS.
APPLICATION FILED DEC. 22, 1905. RENEWED JAN. 12, 1907.
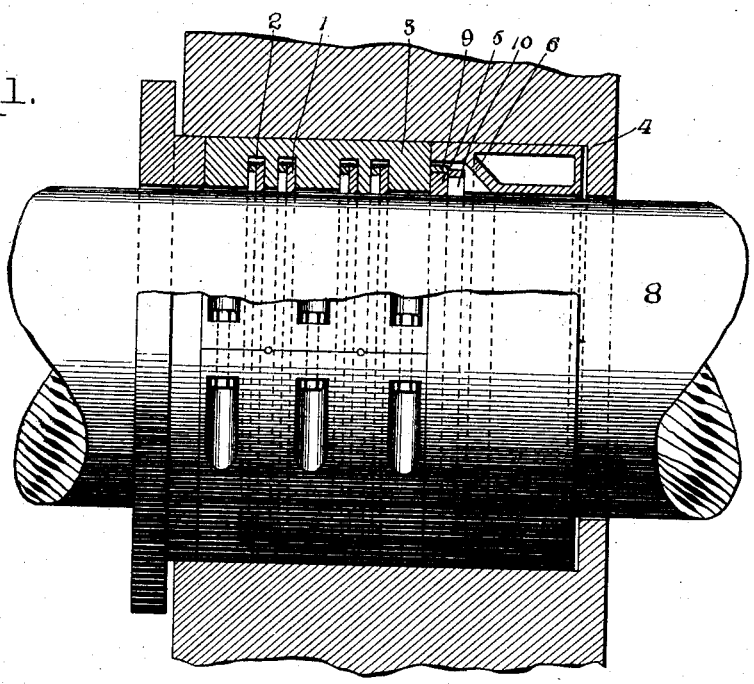
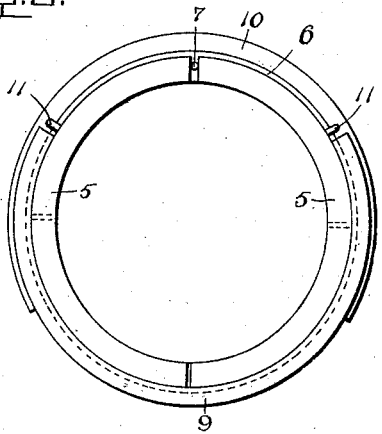 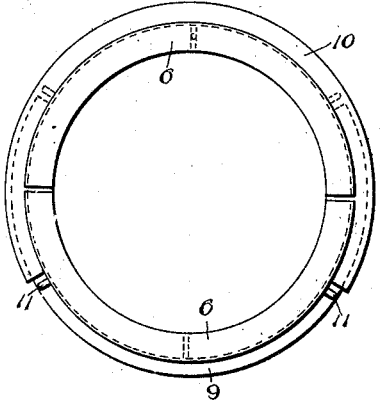

UNITED STATES PATENT OFFICE.

LOUIS H. MARTELL, OF ELLWOOD CITY, PENNSYLVANIA.

PACKING FOR PISTON-RODS.

No. 859,609.

Specification of Letters Patent.

Patented July 9, 1907.

Application filed December 22, 1905. Renewed January 12, 1907. Serial No. 352,056.

*To all whom it may concern:*

Be it known that I, LOUIS HENRY MARTELL, residing at Ellwood City, in the county of Lawrence and State of Pennsylvania, a citizen of the United States, have invented or discovered certain new and useful Improvements in Packing for Piston-Rods, of which improvements the following is a specification.

The invention described herein relates to certain improvements in packings for piston rods, and has for its object a construction and combination of parts which will be capable of withstanding the severe usage to which piston packings are subjected in gas and other engines.

The invention is hereinafter more fully described and claimed.

In the accompanying drawings forming a part of this specification, Figure 1 is a view partly in section and partly in elevation showing a piston rod and packing embodying my improvements; Figs. 2 and 3 are plans of opposite sides of the explosion packing.

In the practice of my invention the packing rings 1, of the usual or any suitable construction, are arranged in grooves 2 in the case or cage 3. The explosion packing, which will be hereinafter more fully described, is arranged in such position with reference to the rings 1 as to take the force of explosions in the cylinder. In the construction shown the explosion rings are arranged in a recess in the annular block 4 and held in position in said recess as against outward movement by the block 3. If desired the annular block 4 can be made hollow for the circulation of water.

While this packing is preferably constructed to form a comparatively tight joint around the rod, it is designed to be used in connection with other packing rings and its main function is to break the force of explosions. When used in explosive engines or engines using fluids having a high temperature, it is found impracticable to employ the usual form or construction of spring for causing the sections to move inwardly to compensate for wear. The explosion packing consists of two series of ring sections 5 and 6, so arranged that the sections of one series will cover the joints between the sections of the other series, as shown in Figs. 2 and 3.

In order to prevent the sections of one series to creep around on the other the two series are interlocked with freedom for radial movement by any suitable means, as a dowel pin 7 secured to one section and projecting between adjacent ends of sections of the other series.

In order to cause the sections to move in and bear upon the piston rod 8, springs in the forms of segments 9 and 10 of a circle are employed, said segments being greater than a semi-circle. The internal diameters of these segments is less than the external diameters of the rings formed by the sections 5 and 6, so that they will tend to push the sections inwardly. These springs can be made of any material having some resilience and not liable to be injuriously affected by high heat such as occurs in gas engines, such for example as cast-iron. These spring segments are placed outside of the sections 5 and 6 in such manner as to cover the peripheral spaces between the ends of said sections as shown in Figs. 2 and 3. The spring segments are interlocked as by pins 11 with the sections 5 and 6 to prevent the segments from moving around on the sections. While not necessary, it is preferred that the sections or segments should be so constructed that the joint or line of bearing of one of the segments on the peripheries of the inclosed sections, should be covered or overlapped by the sections of the other series or their segment. This function can be attained by making the sections of one series and their segment of a width different from the width of the sections of the other series and their spring segment.

It will be understood by those skilled in the art that a plurality of sections 5 or 6 can be employed, but the section 5 should be so arranged as to cover the joints between sections 6, and vice versa. The resilient segment 10 should have such a peripheral length that it will bear upon all the sections, covering the joints between adjacent sections, and constantly pressing the latter in towards the piston rod. As one of its main functions is the exerting of such pressure on the sections its peripheral length should be less than the entire peripheral length of the sections.

I claim herein as my invention:

1. A packing for piston rods having in combination two ring cestions and a resilient ring segment embracing more than half of the ring sections and forming a packing joint with the ring sections.

2. A packing for piston rods having in combination two series of ring sections and two resilient ring segments embracing respectively the ring sections, and overlapping the joints between said sections.

3. A packing for piston rods having in combination two series of ring sections and two resilient ring segments embracing respectively more than half of the ring sections, and forming one of the packing elements.

4. A packing having in combination two ring sections and a resilient ring segment having a length greater than either of the ring sections and forming with such sections a packing joint.

5. A packing for pistons having in combination two series of ring sections, the sections of one series being wider than those of the other series and two resilient ring segments embracing respectively the ring sections.

6. A packing for pistons having in combination two series of ring sections, the sections of one series being wider than those of the other series, and two resilient ring segments differing in width and embracing respectively the ring sections.

7. A packing having in combination ring sections and a resilient ring segment, having a bearing on all the sections and forming a packing joint with such sections.

8. A packing for pistons having in combination two series of ring sections and two ring segments formed of cast-iron and embracing respectively the ring sections and overlapping the joints between said sections.

In testimony whereof, I have hereunto set my hand.

LOUIS H. MARTELL.

Witnesses:
CHARLES BARNETT,
J. C. McCORMICK, Jr.